May 7, 1968     SINGKATA TONGYAI ET AL     3,382,111

COATING METAL

Filed April 26, 1965

INVENTORS
Singkata Tongyai
Ludwig K. Schuster
William A. Blum

BY Connolly and Hutz
ATTORNEYS

United States Patent Office 3,382,111
Patented May 7, 1968

3,382,111
COATING METAL
Singkata Tongyai, Warrington, Ludwig K. Schuster, Dresher, and William A. Blum, Fort Washington, Pa., assignors to Pennsalt Chemicals Corporation, Philadelphia, Pa., a corporation of Pennsylvania
Filed Apr. 26, 1965, Ser. No. 450,859
7 Claims. (Cl. 148—6.16)

The present invention relates to the coating of metal, particularly for the purpose of increasing the resistance of the metal to corrosion and its adhesion for paint.

Among the objects of the present invention is the provision of novel coating mixtures, methods for coating with such mixtures, and coated products resulting therefrom.

Figure 1:
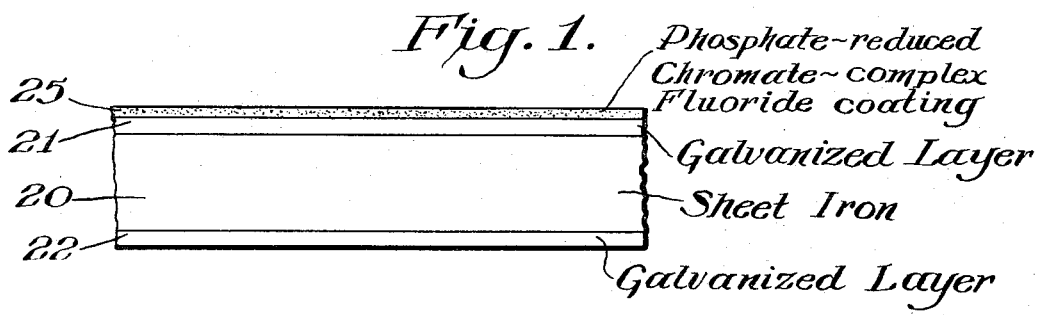
Figure 2:
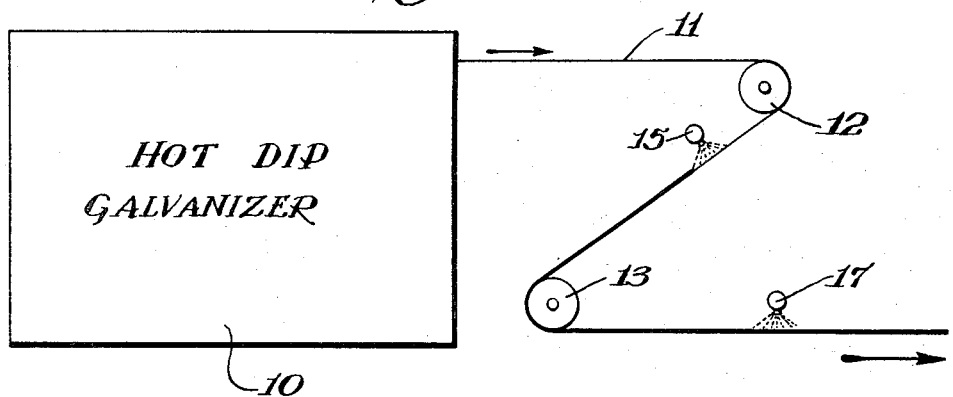

The foregoing as well as additional objects of the present invention will be more fully understood from the following description of several of its exemplifications, reference being made to the accompanying drawings in which:

FIG. 1 is an elevational view of a metal coated in accordance with the present invention; and FIG. 2 is a schematic illustration of one technique for applying the coatings of the present invention.

It has been discovered that particularly desirable coatings are produced from aqueous coating solutions containing chromic acid, phosphoric acid, a complex fluorine-containing acid selected from the class consisting of fluosilicic, fluotitanic, fluoboric and fluozirconic acids, a reducing agent for the hexavalent chromium when the solution is dried and then heated to at least about 200° F., said reducing agent being compatible with the hexavalent chromium while dissolved, the weight ratio of chromic acid to phosphoric acid being from about 3:1 to 1:2, the complex fluoride acid being in a concentration of from about 1/10 to about the same weight as the total of the chromic and phosphoric acids, said acids being not more than partially neutralized with a base selected from the class consisting of zinc, calcium and ammonium hydroxides and mixtures thereof, and the reducing agent being in a concentration that causes about 40 to about 95% of the hexavalent chromium to be reduced to trivalent condition when the dried solution is heated to 200° F. Corrodible metals coated with such solutions which are then cured, show very significant improvements in both their corrosion resistance and adhesion for paints.

It is a feature of the present invention that galvanized iron, particularly in sheet form, when coated in the above way is suitable for direct painting and furthermore even if unpainted, shows a strikingly low tendency to white rust formation. Moreover, the coating of the present invention is readily and simply applied to such galvanized iron made by hot-dip galvanizing as the galvanized iron is emerging from such treatment and is still hot. The coating can then be applied and cured without supplemental heat treatments so that the coating equipment is very simply added to a hot-dip galvanizing apparatus with a minimum of inconvenience.

The following examples show typical coating formulations and techniques pursuant to the present invention:

EXAMPLE I

There is diluted to 1 liter with water, a mixture of

| | Grams |
|---|---|
| $ZnCr_2O_7$ dissolved in 20 ml. water | 5.56 |
| $CrO_3$ | 0.542 |
| Polyethylene glycol having an average molecular weight of about 9000 | 1.363 |
| $Zn(H_2PO_4)_2$ | 5.37 |
| $H_3PO_4$ as 75% solution in water | 2.19 |
| $(NH_4)_2SiF_6$ | 3.65 |

The diluted mixture is a clear orange-colored solution that can be used as a dip coating bath for galvanized iron sheets. After dipping in this bath held at 200° F., the sheets are permitted to drain and then are passed through an air oven operating at 325° F. The coating dries to form an almost colorless transparent layer weighing about 18 milligrams per square foot. No appreciable color change can be observed during the heating operation. It shows a 300 to 400 hour resistance to corrosion by a spray of 5% NaCl solution.

When an organic finish is applied, the adhesion to the coated galvanized layer is excellent. Test specimens coated with an air-dried alkyd enamel scribed and exposed to 5% salt spray, showed no creep from the scribe or loosening of the paint film after 500 hours exposure. With a polyvinyl chloride acetate paint instead of the alkyd paint, the final product resists 1000 hours of such salt spray.

Similar results are also obtained when the bath is held at room temperature during the dip treatment.

Where paints are applied over the coatings of the present invention, the paint layers can be baked at temperatures high enough, that is over 200° F., to further the cure of the chromium-containing coating. Such coating can accordingly be only slightly cured, as by heating to 200° F., only before the paint is applied. The baking of the paint layer at 325° F., for example, will then complete the cure to the desired degree. Such a technique is particularly effective in treating aluminum surfaces.

EXAMPLE II

| | Grams |
|---|---|
| $ZnCr_2O_7$ | 2.33 |
| $CrO_3$ | 0.227 |
| Polyethylene glycol having an average molecular weight of about 2000 | 0.43 |
| $Zn(H_2PO_4)_2$ | 2.26 |
| $H_3PO_4$ | 0.92 |
| $ZnSiF_6 \cdot 6H_2O$ | 3.33 | are all dissolved in water to make a liter of solution which is sprayed on a moving strip of type 3003 aluminum unwound from a coil and passed through a cleaning bath in which the strip is subjected to a 5% aqueous solution of sodium metasilicate and 0.25% of Triton X-100 (Rohm & Haas, Philadelphia, Pa.), at 150° F. The strip is rinsed with tap water before the spraying, and after the spraying is passed alongside a row of ceramic gas burners heated red hot. The metal temperature is raised to 212° F. by the burners, and the coating is thus cured to a final weight of 8 milligrams per square foot. The coated aluminum also shows exceptionally high corrosion resistance and paint adhesion, particularly if the painted product is baked at 450° F. for two minutes.

EXAMPLE III

| | Grams |
|---|---|
| $ZnCr_2O_7$ | 13.9 |
| $CrO_3$ | 1.35 |
| $Ca(H_2PO_4)_2$ | 13.8 |
| $H_3PO_4$ | 14.5 |
| $(NH_4)_2TiF_6$ | 11.3 |
| Polyethylene glycol having an average molecular weight of 300 | 2.42 | are dissolved in sufficient water to make 1 liter of solution, and used to coat a cleaned 9 mil thick blackplate in place of the coating solution of Example VIII in U.S. Patent 3,053,693, granted Sept. 11, 1962. The resulting coated metal after curing has a much greater paint adhesion than the corresponding product of that Example VIII after curing. Its coating weight is about 30 milligrams per square foot.

EXAMPLE IV

To the take-up or recoiling end of a continuous strip hot-dip galvanizer there is added a coating spray as illustrated in FIG. 2. The galvanizer itself is shown schematically at 10 and is one that produces a minimum spangle coating by applying steam to the freshly galvanized surfaces. The resulting strip 11 is brought down to floor level by reversing rollers 12, 13, and a set of coating spray nozzles 15 is located to spray one face of the strip where its temperature is about 350–375° F. The sprayed material is the solution of Example I, and it is sprayed on with a coverage that provides a cured coating weight of 20 milligrams per square foot.

With the strip moving at a linear speed of 200 feet per minute, the sprayed-on coating dries and cures before the strip is eight feet beyond the spray site. By the completion of the cure the strip temperature has dropped to about 275° F. It is still too hot for coiling, and reversing roller 13 which engages the strip after it is fully cured, can be water-cooled to further reduce its temperature to about 230° F. A final water-spray 17 can then be applied to reduce the strip temperature to 140° F.

The entire apparatus takes up no more floor space than the galvanizer without the coating nozzle 15, and in fact the extra cooling of the strip by the coating reduces the overall travel required for the strip to cool down to coiling temperature.

The coated strip produced by the apparatus of FIG. 2 is shown in enlarged end view, partially broken away, in FIG. 1. The sheet iron core 20 has galvanized layers 21, 22 on both its faces, and the coating 25 of the present invention on one of the galvanized layers 21. It readily receives paint over coating 25, and the paint shows no tendency to peel, whether it be a polyvinyl chloride-acetate, acrylic, alkyd, butadiene-styrene, or oleoresinous paint. Although only one surface is generally painted, both sides can be given the coating of the present invention.

The coating technique of Example IV is particularly desirable because it can be carried out on existing apparatus changed only by the addition of the coating spray. Moreover, it does not interfere with the galvanizing operation. The galvanizing line is sometimes subject to variation in the linear speed with which the strip passes through and if it is desired to minimize variation in thickness of the coating of the present invention, the spray nozzles 15 can be supplied with coating mixture by pumps driven at speeds that vary as the line speed varies. For instance, the spray supply pump can be driven by a power take-off from the shaft of reversing roll 12, and the spray can be projected by air jets that maintain a velocity sufficient to adequately spray on the coating mixture when supplied at a very low rate.

In the event the galvanizing line stops or slows down sufficiently, the strip portion not yet coated in accordance with the present invention may cool to the point that the coating applied upon resumption of normal movement will not cure properly unless subjected to auxiliary heating. To this end a bank of infrared heating lamps or similar heaters can be provided just below the coating spray area for turning on when the temperature of the approaching strip drops below about 300° F.

The coatings of the present invention are particularly desirable for application to galvanized, that is zinc, surfaces whether electrogalvanized or hot-dip galvanized, as well as to aluminum or aluminized surfaces because paints will not adhere adequately to such metals. However, the coatings of the present invention can be applied to all corrodible metals including SAE 1010 and plain carbon steels generally, magnesium, lead, copper and even stainless steel. The reduction of the concentration of complex fluoride to below about 10% of the combined weight of the chromic and phosphoric acids significantly detracts from the paint adhesion characteristics, whereas increasing that concentration so as to make the complex fluoride acid the major acid constituent lowers the corrosion resistance, particularly when the coating is on a ferrous surface. Similarly, decreasing to below 40% the degree of conversion of the chromium to trivalent condition, or materially departing from the 3:1 to 1:2 range of proportions with respect to the phosphoric acid as described above, also detracts from the corrosion resistance. The phosphoric acid seems to have a very desirable effect on mixtures that contain the complex fluorides.

It is preferred that the neutralization of the mixed acids in the coating solution of the present invention be sufficient to assure that all or nearly all of the phosphoric acid is converted to completely neutralized form. It should be noted, however, that the trivalent chromium produced by the reduction of the chromic acid can also be considered as neutralizing the phosphoric acid. By thus neutralizing the phosphoric acid, that acid is kept from excessively attacking the surface of the coated metal.

On the other hand, the coating solution should not have all its acids completely neutralized with the above-mentioned bases since this causes the solution to have a relatively high pH and lowers the effectiveness of the reducing agent in reducing the hexavalent chromium. Zinc is the preferred cation for the formulations of the present invention inasmuch as when present as the only cation it provides coatings with maximum corrosion resistance. When ammonium cations are present they may be driven off before the curing operation is completed and may accordingly not be present in the final coating. Accordingly, when such ions are to be used there should be enough of one or both of the other ions or of chromium to effect the desired neutralization of essentially all the phosphoric acid. Highly effective coatings are provided even if some attack of the base metal does occur, but such attack changes the base metal by etching away some of it, converting it to additional phosphate salt, and should be avoided where such metal removal is not desired.

The coating formulations of the present invention can use any kind of reducing agent that is compatible with the hexavalent chromium while the formulation is in the form of solution. Typical reducing agents for this purpose are referred to in U.S. Patent 3,053,693 as well as in U.S. patent application Ser. No. 222,864, filed Sept. 11, 1962. Gluconic acid is also a good reducing agent. The polyethylene glycols of high molecular weight and particularly with a molecular weight about as high as 9,000, have an extremely long life in the coating formulation even if the formulation is kept close to its boiling point. Moreover, they also give very effective conversion of the chromium during the curing operation so that they are preferred.

The cured coatings of the present invention are hydrophobic in nature, particularly when coated on aluminum. However, upon dipping or flooding with water, particularly hot water, the coatings tend to have a somewhat diminished corrosion resistance when on galvanized surfaces. This effect begins to be felt when the treating water is a temperature of about 140° F. and the treatment time is of the order of two minutes or more. It is accordingly feasible to cool the coated strip emerging from the apparatus of FIG. 2 by washing or spraying both faces with water without significantly detracting from the desirable characteristics of the cured coating.

If desired the coating of the present invention can be applied to both faces of the galvanized strip as by spraying the coating formulation on both faces of the strip as it descends from the reversing roller 12, or by applying the coating formulation with roller applicators or the like.

The coatings of the present invention can also be applied to freshly aluminized steel, or freshly tinned steel in a manner similar to that shown in FIG. 2. In each case the freshly coated metal is hot and the coatings of the present invention can be applied and cured on the hot metal with the same advantages referred to in connection with FIG. 2. In addition the freshly coated metal does not have to be cleaned before the coatings of the present invention are applied. In some cases, as with tin plating, the palm oil or other oil generally applied to the fresh plating is not applied to the surface that is to have the coatings of the present invention. Such oil layers interfere with the application of these coatings.

Instead of the complex fluorine-containing acids referred to above, fluophosphoric and fluochromic acid can be used to give coatings equivalent to those of the present invention. With such substitutions some of the phosphoric and of the chromic acid can be omitted in a molar amount equal to the number of moles of fluophosphoric and/or fluochromic acid present. The fluophosphoric and fluochromic acids function like combinations of phosphoric or chromic acid respectively, with complex fluorine-containing acids, and can even provide all the phosphoric and/or chromic acid in the coating formulations of the present invention. A typical example of such a formulation is:

EXAMPLE V

One liter of a solution is prepared by dissolving the following materials in water:

| | Grams |
|---|---|
| $ZnCr_2O_7$ | 5.56 |
| $CrO_3$ | 0.54 |
| $H_2PO_3F$ | 11.25 |
| Polyethylene glycol having a molecular weight of about 1000 | 1.00 |

This solution gives excellent coatings on SAE 1020 steel surfaces when cured at 300° F., as well as on electrogalvanized steel sheet when cured at 350° F. The coating weights formed on these surfaces by dipping are about 22 milligrams per square foot.

Regardless of the specific coating bath formulation used, the curing temperature required is at least 200° F. When cured at 200° F., the coatings are generally not quite as effective as when cured at 212° F. or better still 250° F. However, on aluminum surfaces the coatings cured at 200° F. are not appreciably different in paint adhesion or corrosion resistance from even the most vigorously cured coatings.

Obviously many modifications and variations of the present invention are possible in the light of the above teachings. It is, therefore, to be understood that within the scope of the appended claims the invention may be practiced otherwise than as specifically described.

What is claimed is:

1. An aqueous coating solution containing chromic acid, phosphoric acid, a complex fluorine-containing acid selected from the class consisting of fluosilicic, fluotitanic, fluoboric and fluozirconic acids, a reducing agent for the hexavalent chromium when the solution is dried and then heated to at least about 250° F., said reducing agent being compatible with the hexavalent chromium while dissolved, the weight ratio of chromic acid to phosphoric acid being from about 3:1 to 1:2, the complex fluoride acid being in a concentration of from about $\frac{1}{10}$ to about the same weight as the total of the chromic and phosphoric acids, said acids being not more than partially neutralized with a base selected from the class consisting of zinc, calcium and ammonium hydroxides and mixtures thereo, and the reducing agent being in a concentration that causes about 40 to about 95% of the hexavalent chromium to be reduced to trivalent condition when the dried solution is heated to at least 200° F.

2. The combination of claim 1 in which the reducing agent is a polyethylene glycol having a molecular weight of at least about 300.

3. An aqueous coating bath containing a mixture of the following partially neutralized acids:

2 to 15 grams per liter of chromic acid;
2 to 30 grams per liter of phosphoric acid;
2 to 15 grams per liter of a complex fluorine-containing acid selected from the glass consisting of fluosilicic, fluotitanic, fluoboric and fluozirconic acids, the concentration of the complex acid being no higher than the sum of the concentrations of the chromic and phosphoric acids, the partially neutralizing base being selected from the class consisting of zinc, calcium and ammonium hydroxides and mixtures thereof, the solution further containing a reducing agent compatible with the hexavalent chromium while in solution but effective to cause from about 40 to about 95% of the hexavalent chromium to be reduced to trivalent condition when the solution is dried and the dried residue heated to at least about 200° F.

4. A method for increasing the corrosion resistance and paint adhesion of a corrodible metal, which method comprises the steps of applying to a surface of the metal the solution of claim 1, then drying the thus coated surface and heating it to a temperature of from about 200 to 500° F.

5. The method of claim 4 in which the corrodible metal is galvanized iron, and the heating is to a temperature between about 200 and about 350° F.

6. The method of claim 4 in which the solution is applied to the galvanized iron surface as the galvanized iron is emerging from a hot galvanizing treatment and while that surface is still hot from that treatment, and the amount of coating solution applied is such that the final coating weighs about 5 to 40 milligrams per square foot.

7. The product produced by the method of claim 5.

References Cited

UNITED STATES PATENTS

| 2,163,583 | 6/1939 | Buzzard | 148—6.16 |
| 2,438,877 | 3/1948 | Spruance | 148—6.16 |
| 2,678,291 | 5/1954 | Spruance et al. | 148—6.16 |
| 2,768,104 | 10/1956 | Schuster et al. | 148—6.16 |
| 2,859,147 | 11/1958 | Jeremias | 148—6.16 |
| 3,094,441 | 6/1963 | Curtin et al. | 148—6.16 |

RALPH S. KENDALL, *Primary Examiner.*

UNITED STATES PATENT OFFICE
CERTIFICATE OF CORRECTION

Patent No. 3,382,111 May 7, 1968

Singkata Tongyai et al.

It is certified that error appears in the above identified patent and that said Letters Patent are hereby corrected as shown below:

Column 6, line 17, "glass" should read -- class --

Signed and sealed this 23rd day of September 1969, (SEAL)
Attest:

Edward M. Fletcher, Jr.
Attesting Officer

WILLIAM E. SCHUYLER, JR.
Commissioner of Patents